INVENTORS
FRED A. OTTER JR.
PETER R. SOLOMON
GEORGE B. YNTEMA
BY Donald J. Bradley
ATTORNEY United States Patent Office 3,421,330
Patented Jan. 14, 1969

3,421,330

THERMOMAGNETIC TRANSFER OF HEAT THROUGH A SUPERCONDUCTOR

Fred A. Otter, Jr., Manchester, Peter R. Solomon, Bloomfield, and George B. Yntema, Bolton, Conn., assignors to United Aircraft Corporation, East Hartford, Conn., a corporation of Delaware Filed Apr. 17, 1967, Ser. No. 631,480
U.S. Cl. 62—3 14 Claims
Int. Cl. F25b *21/00*

ABSTRACT OF THE DISCLOSURE

Heat is transportated from one side of a superconductor to the other by means of moving vortices formed therein when the superconductor is placed in a magnetic field and an electrical current is passed through the superconductor in a direction perpendicular to the magnetic field thereby exerting a force on the vortices in a direction perpendicular to the field and to the current.

BACKGROUND OF THE INVENTION

*Field of invention*

This invention relates to the flow of heat through superconductors that are in the mixed and intermediate state and more particularly to methods and apparatus for cooling a material below the temperature of its surroundings in the range between 0 and 18° K.

*Description of the prior art*

In the superconductor art, it is commonly known that when a magnetic field above a critical value is applied to a superconductor (a material that has no resistance when its temperature is reduced to a point near absolute zero) a pattern of cylindrical cores of normally conducting material (vortices) are produced in the superconductor. Above the critical value of magnetic field, the flux lines, heretofore expelled from the superconductor material, are able to penetrate and pass through the superconductor at the centers of the vortices. Cylindrical cores of normally conducting material are produced at the center of the vortices and alternate with superconducting material to form what in cross section is a polka dot pattern. See, for example, P. G. DeGennes, Superconductivity of Metals and Alloys (W. A. Benjamin, Inc., New York, 1966).

It is well known in the art that when a current is passed through a superconductor, perpendicular to a magnetic field, a force is exerted on the vortices formed therein, causing them to move perpendicularly to the magnetic field and to the current flow. The tendency is for the vortices to form at one edge of the superconductor and travel through the superconductor to the other edge where they disappear. A potential drop is produced perpendicular to the motion of vortices.

Liquid helium 4 can be cooled to 1° K. by reducing the pressure with pumping. Examples of presently available methods of extending the cooling range below 1° K. are the helium 3 refrigerator and the adiabatic demagnetization technique. Both of these methods are used in conjunction with a liquid helium 4 bath and are very costly. Temperatures as low as 0.3° K. can be reached with helium 3, and temperatures as low as 0.001° K. can be attained using the adiabatic demagnetization technique. All of the presently used techniques and apparatus for cooling below 1° K. are extremely expensive.

SUMMARY OF INVENTION

An object of the invention is to provide an improved method and apparatus for cooling materials.

In accordance with the present invention, vortices in the superconductor, set in motion by the combined effect of a magnetic field and current flow, transport heat from the material to be cooled, through the superconductor, and into a heat sink.

In accordance with further aspects of this invention, the material can be cooled below the temperature of its environment by using the method and apparatus of this invention in conjunction with a liquid helium bath or other refrigerator, without employing the additional expensive apparatus and techniques necessary heretofore.

The foregoing and other objects, features and advantages of the present invention will become more apparent in the light of the following detailed description of a preferred embodiment thereof, as illustrated in the accompanying drawings.

DESCRIPTION OF THE PREFERRED EMBODIMENT

Figure 1:
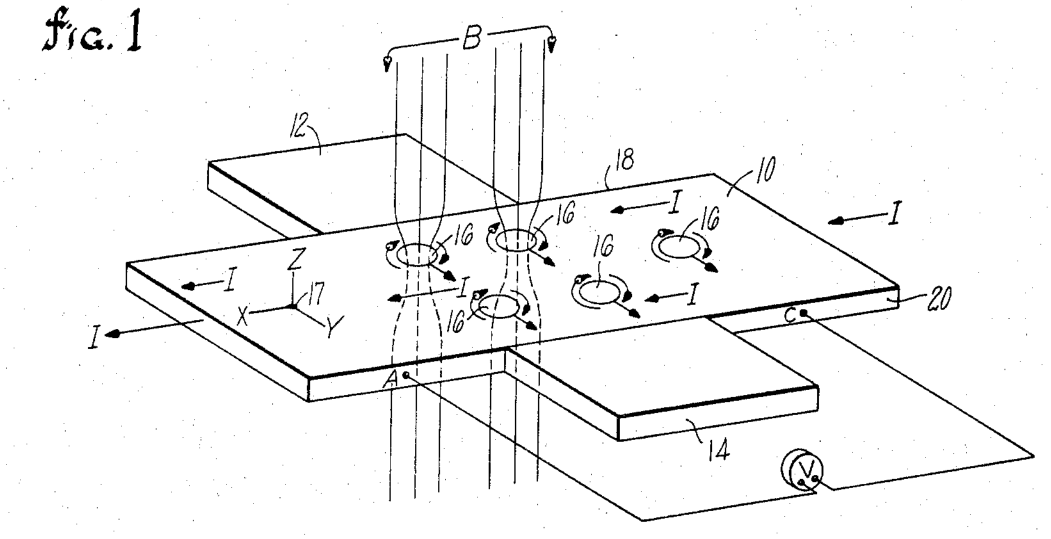
FIGURE 1 is a perspective view illustrating the cooling of a material according to the principles of the invention.

Referring generally to the broad concept of the invention shown in FIGURE 1, a superconducor 10 is placed between, and makes contact with, a material 12 to be cooled and a heat sink 14. Preferably, the superconductor 10 is a Type II superconductor in the mixed state, however, a Type I superconductor in the intermediate state will also form a plurality of vortices 16, as described hereinbefore. A magnetic field B is directed perpendicular to the superconductor 10 is the negative Z direction (see coordinates 17). A source of transport current I is directed through the superconductor along the X axis as indicated. The effect of the current is to apply a force on the vortices 16, causing them to move across the superconductor in the Y direction from one edge 18 to another edge 20; the direction of vortex motion being dependent upon the polarity of the current I and the direction of the magnetic field B. That is, the vortices can be made to travel from the heat sink 14 to the material 12 as well as from the material 12 to the heat sink 14. In FIGURE 1, the vortices 16 are created on edge 18 of the superconductor making contact with the material 12 being cooled, and travel across the superconductor 10 to disappear at the opposite edge 20, in contact with heat sink 14.

Also associated with this magnetic field, transport current flow and motion of vortices is a very small difference of potential developed along the X axis, i.e., between points A and C. The motive power for the heat transfer device is furinshed by whatever external electrical power source is employed to drive the current against this difference of potential.

Each of these moving vortices 16 has a transport entropy, S (meaning that they transport heat) and motion of these vortices across the superconductor 10 transports heat from one side of the superconductor to the other. Therefore, heat is carried away from material 12, across the superconductor and deposited in the heat sink, thus lowering the temperature of the material 12. The heat transporting ability of a vortex is largely associated with the fact that the core of a vortex comprises a normal nonsuperconducting material, yielding a local entropy density which is much higher than the entropy density in the surrounding superconducting regions. The ability of these vortices to hold and transport heat is far greater than any heat transporting capability of random motion molecules in normal metals. In fact, the observed effect is several thousand times larger than the Ettinghausen effect seen in a normal metal, i.e., in the presence of a magnetic field in the Z direction, an electrical current in the X direction produces a perceptible small temperature gradient in the Y direction.

In theory, the force F exerted on the vortices by the current I is equal to J cross $\phi$ divided by $c$. The current density J is derived by dividing the net current I through the superconductor by the superconductor cross-sectional area. The vector $\phi$ has a magnitude equal to $hc/2e$ and a direction parallel to B; $h$ is Planck's constant, $c$ is the speed of light and $e$ is the electrical charge of an electron. If the force F is large enough to overcome pinning (overcome the trapping of the vortices by inhomogenetics, etc.) the vortices move across the superconductor 10 in the Y direction.

The heat current density Q, transported by the vortices is defined as the rate at which the vortices 16 cross the superconductor per unit length of superconductor, times the heat carried per unit length of vortex.

The rate at which the vortices 16 cross a unit length of the superconductor is equal to B times $v$ divided by $\phi$; $v$ is the vortex velocity.

The heat carried per unit length of vortex is equal to S times T; S is the transport entropy of each vortex defined hereinbefore and T is the temperature; therefore, Q equals the quantity B times $v$ divided by $\phi$, times S times T.

Figure 2:
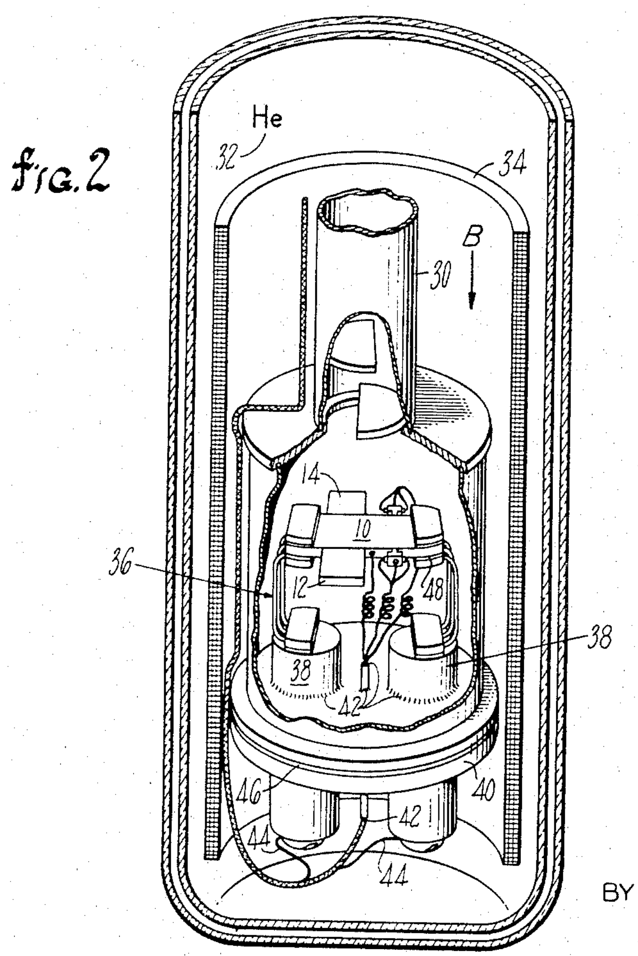
FIGURE 2 is a perspective view of a preferred embodiment of the invention employed to cool a material.

FIGURE 2 is a perspective view of a preferred embodiment of the invention employed to cool a material. A slab-shaped section of superconductor 10 is mounted in an evacuated container 30, which in turn is immersed in a liquid helium bath 32. A magnetic field B, directed perpendicular to the surface of the superconductor 10 is produced by a superconducting solenoid 34 surrounding container 30. To reduce strain, the superconductor 10 is supported by two nonrigid supports 36 made from strands of superconducting wire. The nonrigid supports are connected to two aluminum posts 38, which extend through an aluminum base plate 40 of the container 30. Electrically insulating, vacuum-type seals 42, between posts 38 and base plate 40, and between superconductor leads 44 and base plate 38 can comprise suitable plastic such as Emerson Cummings Stycast 2850 epoxy. An indium O-ring forms a seal 46 between the container 30 and the base plate 40. In addition to supporting the superconductor, the aluminum posts 38 and nonrigid supports 36 serve as the superconductor current leads.

Figure 3:
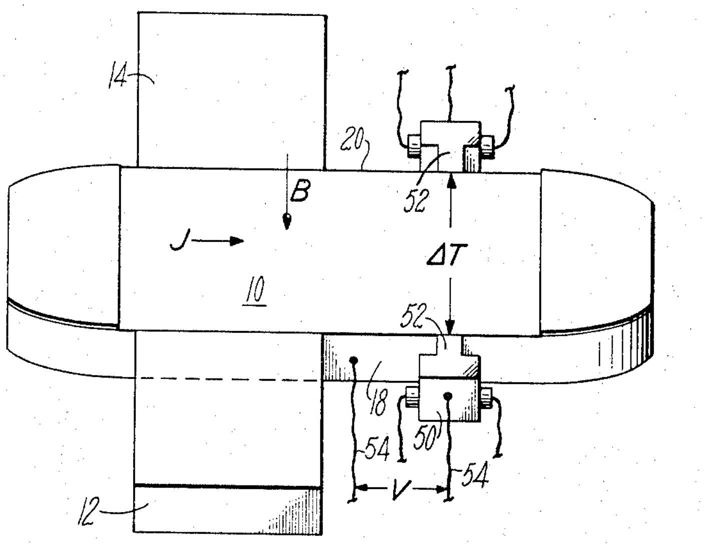
FIGURE 3 is an enlarged view of the superconductor as shown in FIGURE 2.

FIGURE 3 is an enlarged view of the superconductor 10, material 12 and heat sink 14 as disposed in the apparatus. The material 12 to be cooled is placed next to and in contact with one side of superconductor 10, and a heat sink 14 is held in contact with the opposite side of the superconductor. The heat sink 14 can comprise any suitable material connecting the edge of the sample to the helium bath or even the liquid helium bath itself.

Figure 4:
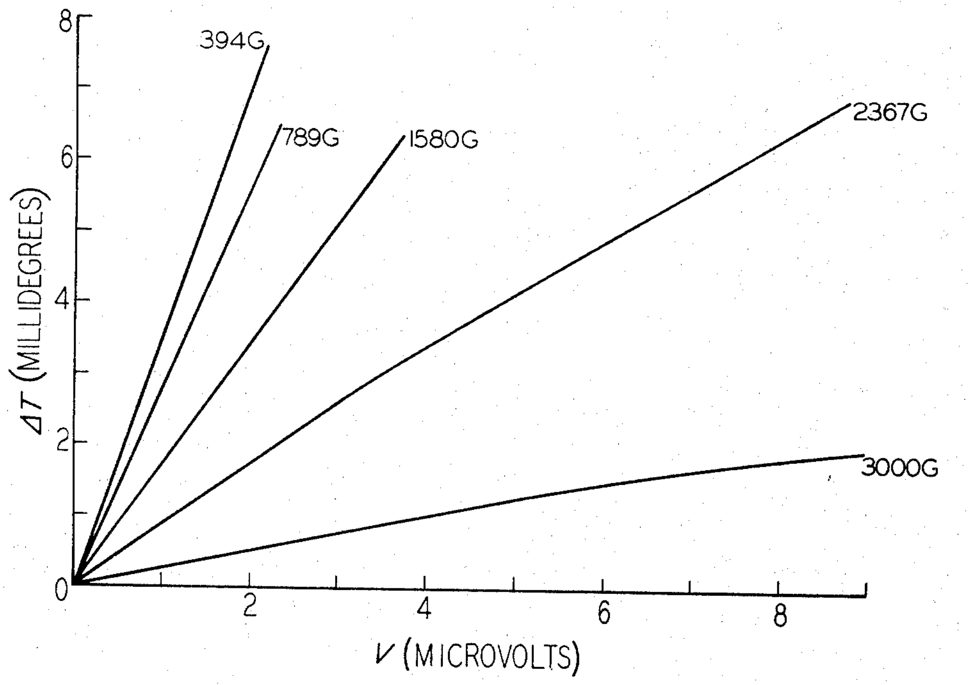
FIGURE 4 is a graph relating the temperature difference across a superconductor to various values of voltage and field intensity for an alloy comprising 40 atomic percent lead, the balance indium.

During transport of heat from material 12 through superconductor 10 to heat sink 14, a temperature difference across the superconductor can be measured by mounting two carbon resistors 50 in copper blocks 52 soldered to the edges 18 and 20 of the superconductor. Electrical potential differences can be measured along the length of the superconductor with suitable equipment connected to leads 54. The heat associated with each vortex is constant at a given magnetic field and temperature so that $\Delta T$, the temperature difference between edge 18 and edge 20 of the superconductor 10, is proportional to V because V is proportional to vortex flow rate. V is the difference in voltage between leads 54. FIGURE 4 is a graph having a family of plots showing data for a Type II alloy and relates the temperature difference $\Delta T$ to various values of voltage V and field intensity B.

A superconductor suitable for use according to the present invention may be prepared by mixing the constituents in a rocker furnace and then quenching. To prepare the desired shape, the material to form the superconductor is first passed through a rolling mill, then squashed to the desired thickness in a hydraulic press and finally cut with a sharp blade. Other suitable methods can be used.

Specific compositions referred to herein have atomic percentages. Any superconductors can be used in the practice of this invention. Some examples are: a Type II alloy of 60% indium, 40% lead and a Type I alloy of 99.95% tin, 0.05% indium. Other materials are alloys of niobium with tantalum, titanium and molybdenum.

Although the invention has been shown and described with respect to a preferred embodiment thereof, it should be understood by those skilled in the art that various changes and omissions in the form and detail thereof may be made therein without departing from the spirit and scope of the invention, which is to be limited and defined only as set forth in the following claims.

Having thus described a preferred embodiment of the invention, what we claim as new and desire to secure by Letters Patent of the United States is:

1. A method of generating a temperature gradient across a superconductor which comprises:
directing a magnetic field through a superconductor to produce vortices therein; and
passing a current through the superconductor at substantially right angles to said magnetic field so that said vortices are transported across said superconductor in a direction mutually perpendicular to the direcion of said magnetic field and said current, said vortices transporting heat across said superconductor and generating a temperature gradient across said superconductor.

2. A method of transporting heat across a superconductor which comprises:
directing a magnetic field through a superconductor to create vortices comprising cores of nonsuperconducting metal therein; and
passing a current through the superconductor in a direction substantialy perpendicular to said magnetic field, said current exerting a force on said vortices causing said vortices to move through the superconductor in a direction mutually perpendicular to said magnetic field and said current whereby said vortices transport heat across the superconductor and generate a temperature gradient across said superconductor.

3. A method of cooling a body of material below the ambient temperature of an environment within which it is disposed comprising the steps of:
interposing a superconductor in thermal conducting relationship between the material and a heat sink;
directing a magnetic field through said superconductor to produce vortices therein; and
pasisng a current through said superconductor in a direction substantially perpendicular to said magnetic field, said vortices transporting heat from the material through said superconductor to said heat sink to thereby cool said material.

4. A method of cooling a body of material below the ambient temperature of an environment within which it is disposed comprising the steps of:
interposing a superconductor in thermal conducting relationship between the material and a heat sink;
directing a magnetic field through said superconductor to create vortices comprising cores of nonsuperconducting metal therein; and
passing a current through said superconductor in a direction substantially perpendicular to said magnetic field for exerting a force on said vortices causing said vortices to move through said superconductor in a direction mutually perpendicular to said magnetic field and said current, whereby said vortices absorb heat from said material and transport said heat from the material through said superconductor to said heat sink to thereby cool said material.

5. The method of claim 4 wherein:

said superconductor is a Type II alloy consisting essentially of 60% indium and 40% lead.

6. The method of claim 4 wherein:

said superconductor comprises a Type I alloy consisting essentially of 99.95% tin and 0.05% indium.

7. The method of claim 4 wherein:

said superconductor comprises an alloy consisting essentially of niobium and tantalum.

8. The method of claim 4 wherein:

said superconductor comprises an alloy consisting essentially of niobium and titanium.

9. The method of claim 4 wherein:

said superconductor comprises an alloy consisting essentially of niobium and molybdenum.

10. An apparatus for cooling a body of material below the ambient temperature of an environment within which it is disposed which comprises:

a heat sink;

a superconductor disposed in thermal conducting relationship between said heat sink and the material;

means for directing a magnetic field through said superconductor; and means for generating a current through said superconductor in a direction substantially perpendicular to said magnetic field so that heat is absorbed from the material and transported through said superconductor to said heat sing to thereby lower the temperature of the material.

11. An apparatus for cooling a body of material below the ambient temperature of an environment within which it is disposed which comprises:

a heat sink;

a superconductor disposed in thermal conducting relationship between said heat sing and the material;

means for directing a magnetic field through said superconductor to create vortices comprising cores of nonsuperconducting metal therein; and means for generating a current through said superconductor in a direction substantially perpendicular to said magnetic field for exerting a force on said vortices causing said vortices to move through said superconductor in a direction mutually perpendicular to said magnetic field and said current whereby said vortices transport heat from the material through said superconductor to said heat sink to thereby lower the temperature of the material.

12. The method of claim 3 and including the step of disposing the material, the superconductor and the heat sink in the same temperature environment and in an evacuated environment.

13. Apparatus as in claim 11 in which said body of material, said heat sink and said superconductor are contained in an evacuated container.

14. Apparatus for generating a temperature gradient across a superconductor comprising:

means for directing a magnetic field through said superconductor, and means for generating an electrical current through said superconductor in a direction substantially perpendicular to said magnetic field, a temperature gradient being produced across said superconductor substantially orthogonal to said magnetic field and said electrical current directions.

References Cited

UNITED STATES PATENTS

| | | | |
|---|---|---|---|
| 2,913,881 | 11/1959 | Garwin | 62—3 |
| 3,154,927 | 11/1964 | Simon | 62—3 |

WILLIAM J. WYE, *Primary Examiner.*